(12) United States Patent
Miura et al.

(10) Patent No.: US 7,650,133 B2
(45) Date of Patent: Jan. 19, 2010

(54) SEMICONDUCTOR INTEGRATED CIRCUIT DEVICE AND HIGH FREQUENCY POWER AMPLIFIER MODULE

(75) Inventors: Toshihiro Miura, Tokyo (JP); Hitoshi Akamine, Tokyo (JP); Yasushi Shigeno, Tokyo (JP); Akishige Nakajima, Tokyo (JP); Masahiro Tsuchiya, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 600 days.

(21) Appl. No.: 11/511,300

(22) Filed: Aug. 29, 2006

(65) Prior Publication Data

US 2007/0049237 A1 Mar. 1, 2007

(30) Foreign Application Priority Data

Aug. 30, 2005 (JP) ............................. 2005-250183

(51) Int. Cl.
*H04B 1/16* (2006.01)

(52) U.S. Cl. ................. 455/341; 455/127.3; 455/194.2; 455/78; 455/144; 327/536; 327/404; 365/226

(58) Field of Classification Search ................ 455/341, 455/127.3, 194.2, 78, 144, 159.2, 253, 293; 327/536, 404; 365/226
See application file for complete search history.

(56) References Cited

U.S. PATENT DOCUMENTS

| | | | |
|---|---|---|---|
| 3,869,660 A * | 3/1975 | Davis et al. | 323/222 |
| 5,134,317 A * | 7/1992 | Ohta | 326/98 |
| 5,774,792 A | 6/1998 | Tanaka et al. | |
| 6,215,329 B1 * | 4/2001 | Campardo et al. | 326/88 |
| 6,785,182 B2 * | 8/2004 | Kamei et al. | 365/226 |
| 7,312,972 B2 * | 12/2007 | Hourai et al. | 361/139 |
| 7,466,189 B2 * | 12/2008 | Sohara et al. | 327/536 |
| 2003/0164517 A1 * | 9/2003 | Kamei et al. | 257/314 |
| 2005/0218966 A1 * | 10/2005 | Azuma et al. | 327/536 |
| 2005/0259482 A1 * | 11/2005 | Hourai et al. | 365/189.06 |
| 2007/0013432 A1 * | 1/2007 | Miyazawa | 327/404 |
| 2007/0049352 A1 * | 3/2007 | Nakajima et al. | 455/571 |
| 2008/0197923 A1 * | 8/2008 | Nakajima et al. | 330/124 R |
| 2009/0038696 A1 * | 2/2009 | Levin et al. | 137/565.11 |
| 2009/0096508 A1 * | 4/2009 | Sohara et al. | 327/536 |
| 2009/0115495 A1 * | 5/2009 | Nakai | 327/536 |

FOREIGN PATENT DOCUMENTS

| | | |
|---|---|---|
| JP | 8-70245 | 3/1996 |
| JP | 2004-353715 | 12/2004 |
| JP | 2005-181669 | 7/2005 |

* cited by examiner

*Primary Examiner*—Minh D Dao
(74) *Attorney, Agent, or Firm*—Mattingly & Malur, P.C.

(57) ABSTRACT

Switching characteristics in an SPDT switch are improved to reduce the rise delay in a low power slot following after a high power slot. Control terminals of an SPDT switch are respectively provided with backflow prevention circuits. The backflow prevention circuit is configured to have two transistors and a diode. In a transmission mode, for example, when a time slot where a high power passes through transistors is followed by a time slot where a low power passes through, the electric charges accumulated in the gates of the transistors are blocked. In the case where the transistors are in the OFF state, the electric charges accumulated in the gates of the transistors are immediately discharged to allow the transistors to be completely turned OFF.

10 Claims, 6 Drawing Sheets

US 7,650,133 B2

SEMICONDUCTOR INTEGRATED CIRCUIT DEVICE AND HIGH FREQUENCY POWER AMPLIFIER MODULE

CROSS-REFERENCE TO RELATED APPLICATION

The present application claims priority from Japanese patent application No. 2005-250183 filed on Aug. 30, 2005, the content of which is hereby incorporated by reference into this application.

BACKGROUND OF THE INVENTION

The present invention relates to a semiconductor integrated device that is mounted on mobile communication equipment and the like, and more particularly to a technology effective in reducing distortion of the transmitted/received signals.

Recently, mobile phones have been developing with various services implemented using data communication in addition to voice communication.

The typical frequency bands of the mobile phone in Europe are the GSM (Global System for Mobile Communicator) system in the 900 MHz band and the DCS (Digital Cellular System) in the 1.8 GHz band, while those in the United States are the PCS (Personal Communication Service) system in the 1.9 GHz band and the GSM system in the 850 MHz band. In addition, the W-CDMA system using the 2 GHz band is now added and the situation makes it essential for the mobile phone terminal to introduce multi-band/multi-mode capabilities.

Along with the introduction of such multi-band/multi-mode capabilities to the mobile phone, a compact and high-performance SPDT (Single-Pole Double-Throw) switch is required for transmit/receive switching, which can select complex high frequency signals.

The SPDT switch is mainly required to reduce higher harmonic distortion.

In order to achieve the reduction of higher harmonic distortion, for example, there is a technology where FETs (Field Effect Transistors) making up the SPDT switch are connected in a cascade configuration (see Patent Reference 1).

When electric power sent from a transmission circuit is transmitted to the side of an antenna through the SPDT switch, the FET, which is in the OFF state and connected to the side of a reception circuit and the antenna side, will not be turned ON because it is not affected by the power of the transmission circuit. Thus, the input power is output to the antenna without leaking to a receiving system, so that a low-loss switch can be realized.

Further, the RF (high frequency) voltage on the FET is dispersed due to the cascaded connection, so that the RF voltage per stage can be reduced. The gate-source capacitance (Cgs) and gate-drain capacitance (Cgd), which cause the harmonic distortion, and the RF voltage imposed on the ON-resistance are all reduced, so that the harmonic distortion can be reduced.

As a measure to further improve the harmonic distortion in the introduction of the multi-gate capability, there is a technology that employs a circuit where a potential supply wiring is provided at a midpoint between the gates of a dual-gate FET (see Patent Reference 2). This makes it possible to stabilize the midpoint potential. As a result, the harmonic distortion can be reduced.

As another measure to improve the harmonic distortion in the introduction of the multi-gate capability, there is a technology that suppresses the amount of potential reduction due to a leak current by changing the potential supply wiring at the midpoint between the gates of the dual-gate FET, thereby to improve the harmonic distortion (see Patent Reference 3).

Further, some of the common SPDT switches are provided with a booster circuit for further reducing the distortion, taking into account the circuit technologies of the above described Patent References 1 to 3.

This booster circuit is connected to the gates of FETs connected between the side of a transmission circuit and the side of an antenna, respectively. When one of the FETs is turned ON, the booster circuit takes a high frequency power from the FET, generates a boosted voltage (approx. 4.5 V) which is higher than a control voltage (approx. 2 V), and applies the boosted voltage to the gate of the FET.

Further, the boosted voltage is applied through the gate of the ON-state FET, to a drain (source) of another OFF-state FET. The gate of the OFF-state FET are at a reference potential VSS (0 V), so that the gate-to-source (drain) voltage Vgs (Vgd) of the FETs is a negative voltage (up to about minus 4.5 V).

Thus, the FET enters a deeper OFF state where the gate-source capacitance (Cgs) and the gate-drain capacitance (Cgd) both decrease, so that the harmonic distortion can be reduced.

Patent Reference 1: Japanese Unexamined Patent Publication No. Hei 8(1996)-70245

Patent Reference 2: Japanese Patent Application No. 2004-353715

Patent Reference 3: Japanese Patent Application No. 2005-181669

SUMMARY OF THE INVENTION

The present inventor has found that the improvement technologies of the harmonic distortion characteristics in the SPDT switch as described above have the following problems.

The harmonic distortion characteristics are improved because the above described booster circuit is provided.

Meanwhile, the GSM system has not only voice communication but also a data communication mode called as the EDGE (Enhanced Data rates for GSM Evolution) mode. As shown in FIG. 8, the both modes carry out communication between a base station and a mobile terminal by the unit of a frame that includes eight communication units, each having a predetermined time period (576.923 µs) referred to as a time slot, at predetermined time intervals (transmission: 34.2 µs, reception: 30.46 µs).

In recent years, a communication mode using the voice communication and the EDGE mode within the same frame, which is referred to as DTM (Dual Transfer Mode) has been introduced in order to implement various services. But then a new problem arises.

In other words, with the conventional transmission mode in the GSM system, the time slots included in the same frame of data to be transmitted have been allocated to either voice communication or data communication. However, in the case of the above descried DTM mode, as shown in FIG. 9, both the voice communication and the data communication are included in the same frame. The voice communication data of the GSM system is phase-modulated, which may have a constant high output power (approx. 33 dBm) in a time slot within the same frame. On the other hand, the EDGE mode which is the data communication performs amplitude modulation in addition to phase modulation, and may have a low output power (approx. 5 dBm)

In the above described DTM mode, the high frequency power for each time slot within the same frame varies depending on the type of data (voice or data communication). There exists a case that a time slot where the high power (approx. 33 dBm) passes through is followed by a time slot where the low power (approx. 5 dBm) passes through in series.

FIG. 10 is a view showing the slot timing of power at a switch output terminal that the inventor has studied. Ideally, the low power slot at 5 dBm following after the time slot at 33 dBm should have a rectangular waveform. However, in the rise of the low power slot following after the high power slot, the output power does not rise rapidly, and a delay occurs as indicated by the dashed line in the figure. As a result, the harmonic distortion is increased, causing a problem that a loss of transmission power occurs.

An object of the invention is to provide a technology capable of preventing a rise delay due to a time slot change in an SPDT switch to substantially reduce the higher harmonic distortion of the SPDT switch.

The foregoing and other objects as well as novel features of the invention will become apparent from the description to be made with reference to the accompanying drawings.

Typical inventions disclosed in the present application will be outlined as follows.

A semiconductor integrated device according to the invention includes: a first terminal connected to an antenna; a second terminal connected to a transmission circuit; a third terminal connected to a reception circuit; a switching transistor provided between the first terminal and the second terminal to switch connection between the first and second terminals; a fourth terminal to which a control signal of the switching transistor is input; a booster circuit for taking a transmission signal output through the switching transistor when a signal is input through the fourth terminal, generating a boosted voltage higher than the voltage level of the input signal, and applying the boosted voltage to a control terminal of the switching transistor; and a voltage controller for performing control so that when the signal level of the transmission signal output through the switching transistor decreases, a drain voltage of the switching transistor is not higher than a gate voltage of the switching transistor.

Further, a semiconductor integrated device according to the invention includes: a first terminal connected to an antenna; a second terminal connected to a transmission circuit; a third terminal connected to a reception circuit; a switching transistor provided between the first terminal and the second terminal to switch connection between the first and second terminals; a fourth terminal to which a control signal of the switching transistor is input; a booster circuit for taking a transmission signal output through the switching transistor when a signal is input through the fourth terminal, generating a boosted voltage higher than the voltage level of the input signal, and applying the boosted voltage to a control terminal of the switching transistor; and a voltage controller for performing control so that when the signal level of the transmission signal output through the switching transistor decreases, a drain voltage of the switching transistor is not higher than a gate voltage of the switching transistor, and when the switching transistor does not operate, the voltage controller discharges the electric charge accumulated in the gate of the switching transistor.

The other inventions of the present application will be further outlined below.

A high frequency power amplifier module according to the invention includes: an antenna connection switching circuit; and a high frequency power amplifier for receiving a transmission signal from a transmission circuit and supplying an amplified transmission signal to the antenna connection switching circuit, wherein the antenna connection switching circuit has: a first terminal connected to an antenna; a second terminal connected to the high frequency power amplifier; a third terminal connected to a reception circuit; a switching transistor provided between the first and second terminals to switch connection of the first and second terminals; a fourth terminal to which a control signal of the switching transistor is input; a booster circuit for taking a transmission signal output through the switching transistor when a signal is input through the fourth terminal, generating a boosted voltage higher than the voltage level of the input signal, and applying the boosted voltage to the switching transistor; and a voltage controller for performing control so that when the signal level of the transmission signal output through the switching transistor decreases, a drain voltage of the switching transistor is not higher than a gate voltage of the switching transistor.

Further, a high frequency power amplifier module according to the invention includes: an antenna connection switching circuit; and a high frequency power amplifier for receiving a transmission signal from a transmission circuit and supplying an amplified transmission signal to the antenna connection switching circuit, wherein the antenna connection switching circuit has: a first terminal connected to an antenna; a second terminal connected to the high frequency power amplifier; a third terminal connected to a reception circuit; a switching transistor provided between the first and second terminals to switch the connection of the first and second terminals; a fourth terminal to which a control signal of the switching transistor is input; a booster circuit for taking a transmission signal output through the switching transistor when a signal is input through the fourth terminal, generating a boosted voltage higher than the voltage level of the input signal, and applying the boosted voltage to the switching transistor; and a voltage controller for performing control so that when the signal level of the transmission signal output through the switching transistor decreases, a drain voltage of the switching transistor is not higher than a gate voltage of the switching transistor, and when the switching transistor dose not operate, the voltage controller discharges the electric charge accumulated in the gate of the switching transistor.

The following is a brief description of effects obtained by typical inventions disclosed herein.

(1) It is possible to prevent a delay in the output power rise while improving the harmonic distortion characteristics of the antenna connection switching circuit.

(2) It is further possible to improve reliability of electronic systems such as communications equipment, by configuring a high frequency power amplifier module using the antenna connection switching circuit as described above in (1).

DETAILED DESCRIPTION OF THE PREFERRED EMBODIMENTS

Figure 1:
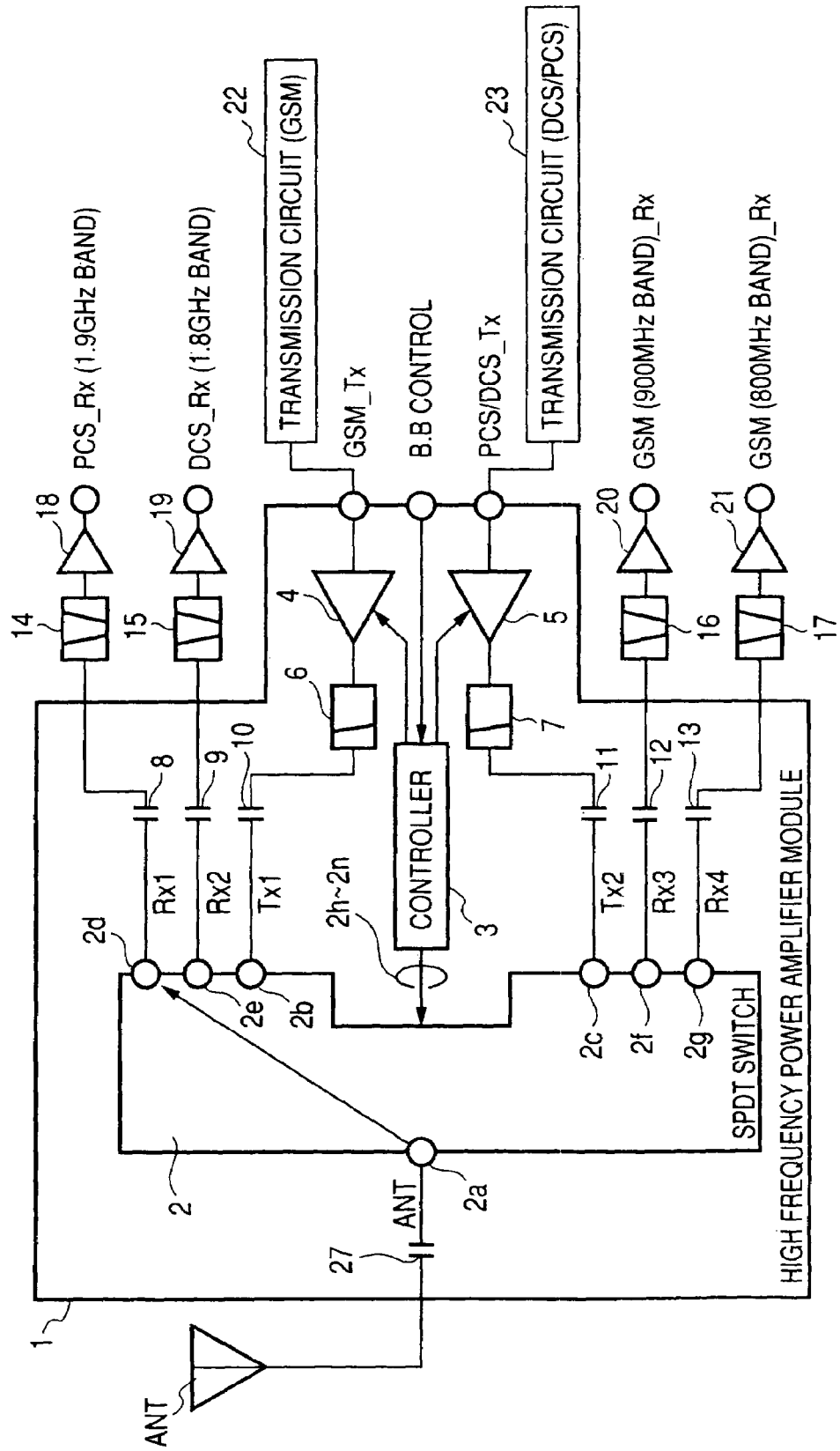
FIG. 1 is block diagram of a high frequency power amplifier module according to an embodiment of the invention.

Hereinafter, embodiments of the invention will be described in detail with reference to the accompanying drawings. Throughout all the drawings for explaining the embodiments, the components having identical functions will be designated by the common reference numerals, and their repeated description will be omitted.

Figure 2:
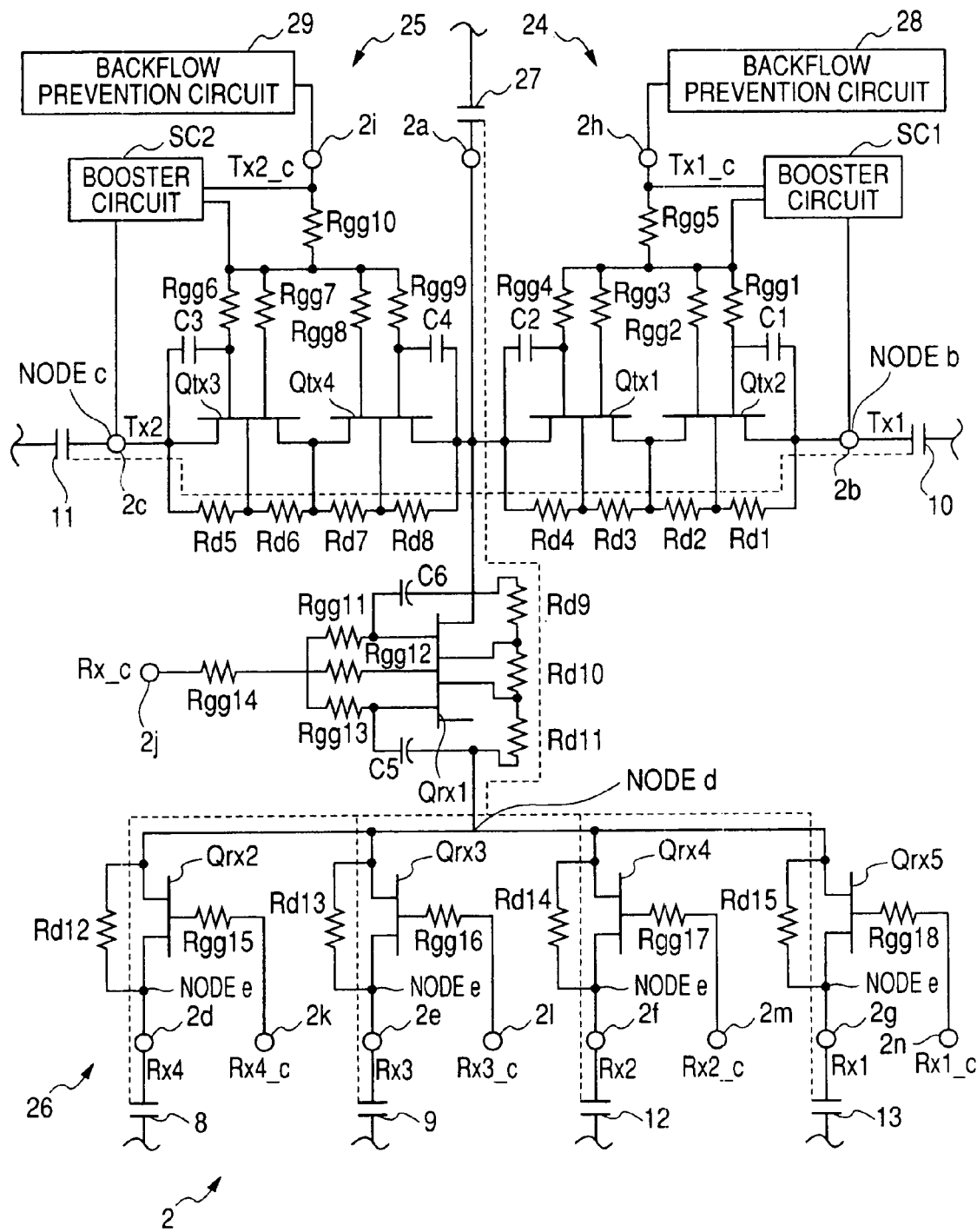
FIG. 2 is a circuit diagram of an SPDT switch provided in the high frequency power amplifier module of FIG. 1.
Figure 3:
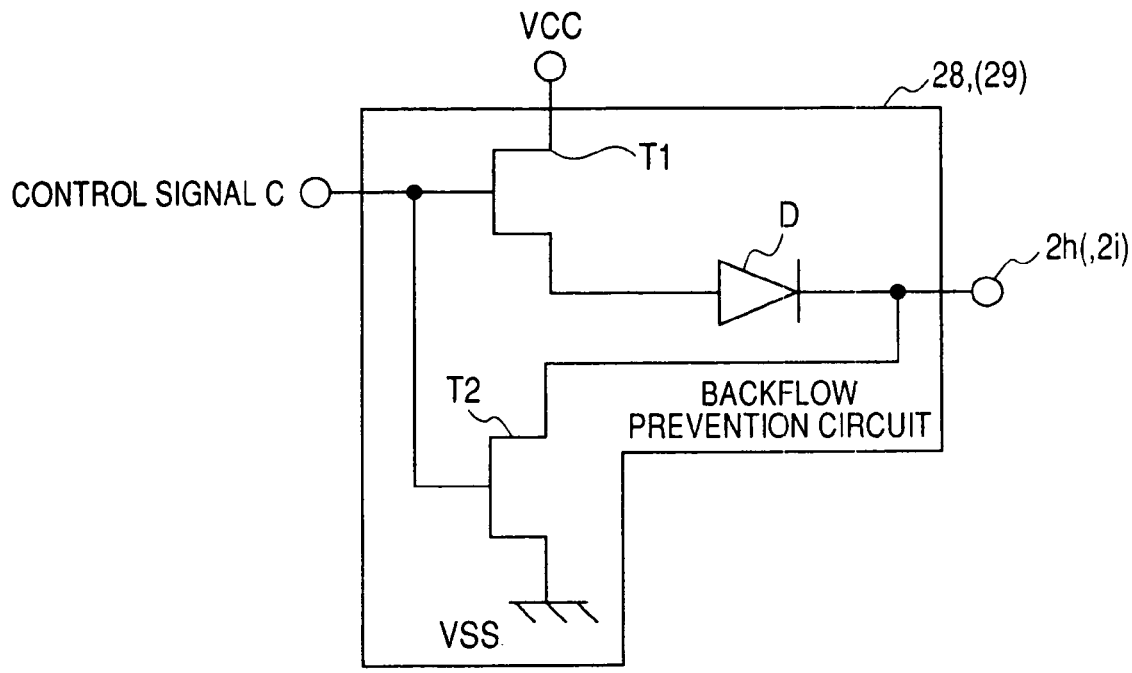
FIG. 3 is a circuit diagram of a backflow prevention circuit provided in the SPDT switch of FIG. 2.
Figure 4:
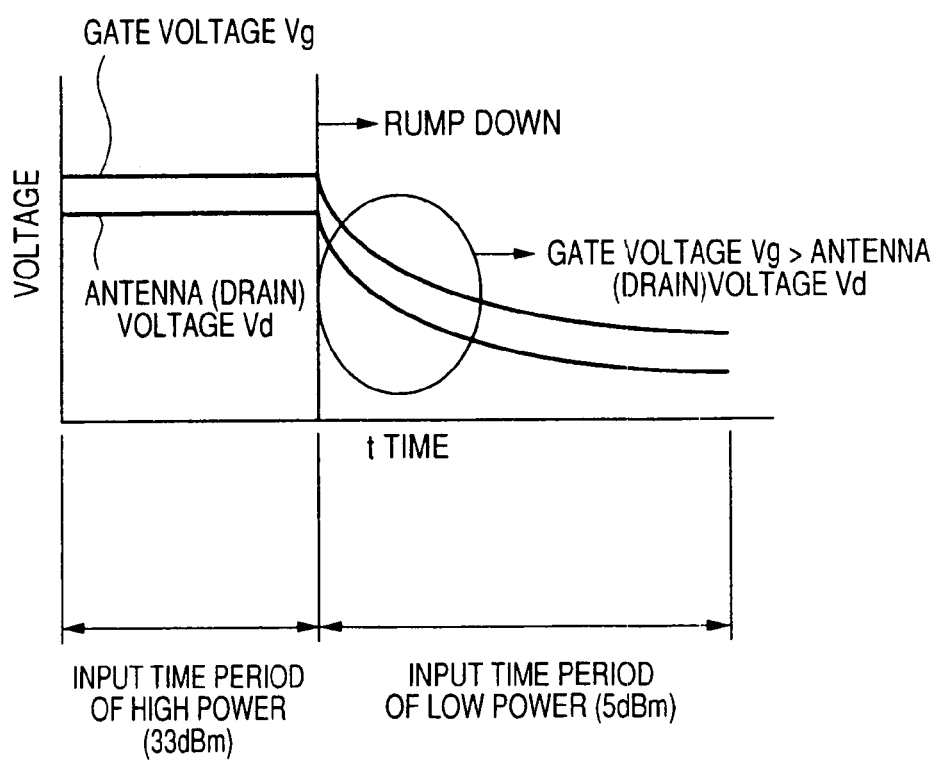
FIG. 4 is a diagram illustrating the relation between the transistor drain (antenna) voltage Vd and the gate voltage Vg in the SPDT switch of FIG. 2.
Figure 5:
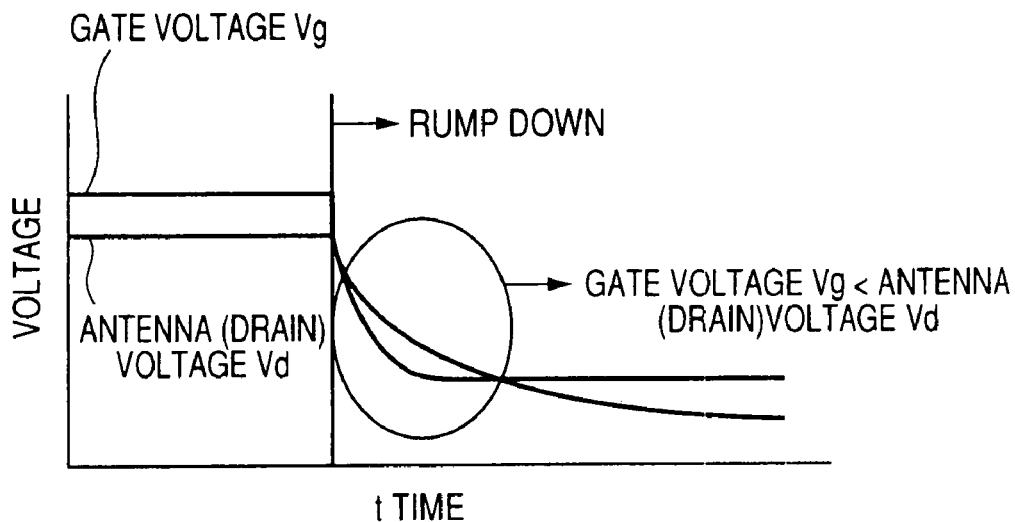
FIG. 5 is a diagram illustrating the relation between the transistor drain (antenna) voltage Vd and the gate voltage Vg in the SPDT switch which is not provided with the backflow prevention circuit that the present inventor has studied.

FIG. 1 is a block diagram of a high frequency power amplifier module according to an embodiment of the invention. FIG. 2 is a circuit diagram of an SPDT switch provided in the high frequency power amplifier module of FIG. 1. FIG. 3 is a circuit diagram of a backflow prevention circuit provided in the SPDT switch of FIG. 2. FIG. 4 is a diagram illustrating the relation between the transistor drain (antenna) voltage Vd and the gate voltage Vg in the SPDT switch of FIG. 2. FIG. 5 is a diagram illustrating the relation between the transistor drain (antenna) voltage Vd and the gate voltage Vg in the SPDT switch which is not provided with the backflow prevention circuit that the inventor has studied.

In the embodiment, a high frequency power amplifier module 1, for example, is a transmission power amplifier module for a mobile phone which is a communications system. As shown in FIG. 1, the high frequency power amplifier module 1 is configured to have an SPDT switch (antenna connection switching circuit, semiconductor integrated device) 2, a controller 3, high frequency power amplifiers (High Power Amps) 4, 5, low-pass filters 6, 7, and electrical capacitors 8 to 13 and 27.

The SPDT switch 2 switches transmitted/received signals based on control of the controller 3. The SPDT switch 2 is equipped with an antenna terminal 2a, transmission signal terminals 2b, 2c, reception signal terminals 2d to 2g, and control terminals 2h to 2n.

The transmission signal terminals 2b, 2c, the reception signal terminals 2d to 2g and the antenna terminal 2a are connected with one ends of the electrical capacitors 8 to 13 and 27, respectively. The other ends of the electrical capacitors 10, 11 are connected with the low-pass filters 6, 7, respectively.

The other ends of the electrical capacitors 8, 9, 12, 13 are connected with SAWs (Surface Acoustic Waves) 14 to 17 which are provided in a reception system circuit, respectively. Connected to the other end the electrical capacitor 27 is an antenna ANT for transmitting and receiving signal waves.

The electrical capacitors 8 to 13 and 27 are provided as DC cut capacitance. The SAWs 14 to 17 each select a propagated signal of a specific frequency as a high frequency signal, using surface acoustic wave in a piezoelectric material.

Further, the subsequent stages of the SAWs 14 to 17 are connected with LNAs (Low Noise Amps) 18 to 21, respectively. The LNAs 18 to 21 each amplify received signals of the frequency bands in the PCS/DSC (1800 MHz/1900 MHz) and the GSM (800 MHz, 900 MHz).

The controller 3 carries out operation control of the SPDT switch 2 with a control signal output from a baseband circuit. The high frequency power amplifier 4 amplifies transmission signals in the frequency bands of GSM, which are supplied from a transmission circuit 22. The high frequency power amplifier 5 amplifies transmission signals in the frequency bands of DCS/PCS, which are supplied from a transmission circuit 23. The low-pass filters 6, 7 allow the transmission frequency bands in the transmitted signals output from the high frequency power amplifiers 4, 5 to pass through, respectively.

FIG. 2 is a circuit diagram showing an example of the SPDT switch 2.

As shown in the figure, the SPDT switch 2 is configured to have transmission signal switching sections 24, 25, and a reception signal switching section 26.

The transmission signal switching section 24 is configured to have transistors (switching transistors) Qtx1, Qtx2, resistances Rgg1 to Rgg5, resistances Rd1 to Rd4, electrical capacitors C1, C2, a booster circuit SC1, and a backflow prevention circuit (voltage controller) 28.

The transmission signal switching section 25 is configured to have transistors (switching transistors) Qtx3, Qtx4, resistances Rgg6 to Rgg10, resistances Rd5 to Rd8, electrical capacitors C3, C4, a booster circuit SC2, and a backflow prevention circuit (voltage controller) 29.

Further, the reception signal switching section 26 is configured to have transistors Qrx1 to Qrx5, resistances Rgg11 to Rgg18, resistances Rd9 to Rd15, and electrical capacitors C5, C6.

These transistors Qtx1, Qtx2, Qtx3, Qtx4, Qrx1 to Qrx5 each include a FET such as, for example, a HEMT (High Electron Mobility Transistor). The transistors Qtx1 to Qtx4 each include a dual gate FET provided with two gates, the transistor (switching transistor) Qrx1 includes a multi gate FET provided with three gates.

The antenna terminal 2a is connected to one ends of the transistors Qtx1, Qtx4, Qrx1, one ends of the electrical capacitors C2, C4, C6, and one ends of the resistances Rd4, Rd8, Rd9, respectively.

Further, one end of the resistance Rgg5 is connected with the control terminal 2h, and the other end of the resistance Rgg5 is connected with one ends of the respective resistances Rgg1 to Rgg4.

The control terminal 2h is connected with the backflow prevention circuit 28. The back prevention circuit 28 is a circuit for preventing discharge of the electric charges accumulated in the gates of the transistors Qtx1, Qtx2.

The other end of the resistance Rgg4 is connected with one gate of the transistor Qtx1 and the other end of the electrical capacitor C2, respectively. The other end of the resistance Rgg3 is connected with the other gate of the transistor Qtx1.

When a signal output from the backflow prevention circuit 28 is input to the transistors Qtx1 and Qtx2 through the control terminal 2h, the booster circuit SC1 takes a transmission signal (in the GSM band) from the transmission signal terminal 2b, generates a boosted voltage higher than the voltage level of the relevant signal, and applies the boosted voltage to the gates of the transistors Qtx1, Qtx2.

The other end of the resistance Rgg1 is connected with one gate of the transistor Qtx2 and one end of the electrical capacitor C1, respectively. The other end of the resistance Rgg2 is connected with the other gate of the transistor Qtx2.

The other end of the transistor Qtx1 is connected with one end of the transistor Qtx2. The other end of the transistor Qtx2 and the other end of the electrical capacitor C1 are connected with the transmission signal terminal 2b, respectively.

The resistances Rd1 to Rd4 are serially connected between the one end of the transistor Qrx1 and the other end of the transistor Qtx2. The junction of the resistances Rd and Rd2 is connected between the gates of the transistor Qtx2, and the junction of the resistances Rd3 and Rd4 is connected between the gates of the transistor Qtx1. The junction of the resistances Rd2 and Rd3 is connected with the junction of the transistors Qtx1 and Qtx2.

The resistances Rd1 to Rd4 are used as resistances for supplying electrical potential between the gates of the transistor Qtx1 and of the transistor Qtx2.

One end of the resistance Rgg10 is connected with the control terminal 2i, and the other end of the resistance Rgg10 is connected with one ends of the respective resistances Rgg6 to Rgg9.

Connected to the control terminal 2i is the backflow prevention circuit 29. This backflow prevention circuit 29 is a circuit for preventing discharge of the electric charges accumulated in the gates of the transistors Qtx3, Qtx4.

The other end of the resistance Rgg6 is connected with one gate of the transistor Qtx3 and the other end of the electrical capacitor C3, respectively. Connected to the other end of the resistance Rgg7 is the other gate of the transistor Qtx3.

The other end of the resistance Rgg9 is connected with one gate of the transistor Qtx4 and the other end of the electrical capacitor C4, respectively. Connected to the other end of the resistance Rgg8 is the other gate of the transistor Qtx4.

The other end of the transistor Qtx3 is connected with one end of the transistor Qtx4. The transmission signal terminal 2c is connected to one end of the transistor Qtx3 and the other end of the electrical capacitor C3, respectively.

The resistances Rd5 to Rd8 are serially connected between the one end of the transistor Qtx3 and the other end of the transistor Qtx4. The junction of the resistances Rd5 and Rd6 is connected between the gates of the transistor Qtx3, and the junction of the resistances Rd7 and Rd8 is connected between the gates of the transistor Qtx4. The junction of the resistances Rd6 and Rd7 is connected with the junction of the transistors Qtx3 and Qtx4.

The resistances Rd5 to Rd8 are used as resistances for supplying the electrical potential between the gates of the transistor Qtx3 and of the transistor Qtx4.

One end of the resistance Rgg10 is connected with the control terminal 2i, and the other end of the resistance Rgg10 is connected with ones end of the respective resistances Rgg6 to Rgg9.

When a signal output from the backflow prevention circuit 29 is input to the transistors Qtx3, Qtx4 through the control terminal 2i, the booster circuit SC2 takes a transmission signal from the transmission signal terminal 2c, generates a boosted voltage higher than the voltage level of the relevant signal, and applies the boosted voltage to the gates of the transistors Qt3, Qtx4.

Further, one end of the resistance Rgg14 is connected with the control terminal 2j, and the other end of the resistance Rgg14 is connected with one ends of the respective resistances Rgg11 to Rgg13.

The other ends of the resistances Rgg11 to Rgg13 are connected with three gates of the transistor Qrx1, respectively. Further, the other end of the resistance Rgg11 is connected with the other end of the electrical capacitor C6, and the other end of the resistance Rgg13 is connected with the other end of the electrical capacitor C5.

The resistances Rd9 to Rd11 are serially connected between one end and the other end of the transistor Qrx1. The junction of the resistances Rd9 and the resistance Rd 10 is connected between the first and second gates of the transistor Qrx1.

Further, the junction of the resistance Rd10 and the resistance Rd11 is connected between the second and third gates of the transistor Qrx1. One end of the electrical capacitor C5 is connected with the other end of the transistor Qrx1, one ends of the transistors Qrx2 to Qrx5, and one ends of the resistances Rd12 to Rd15, respectively.

The other end of the transistor Qrx2 and the other end of the resistance Rd12 are connected with the reception signal terminal 2d, respectively. The other end of the transistor Qrx3 and the other end of the resistance Rd13 are connected with the reception signal terminal 2e, respectively.

The other end of the transistor Qrx4 and the other end of the resistance Rd14 are connected with the reception signal terminal 2f, respectively. The other end of the transistor Qrx5 and the other end of the resistance Rd15 are connected with the reception signal terminal 2g, respectively.

Further, the gates of the transistors Qrx2 to Qrx5 are connected with one ends of the resistances Rgg15 to Rgg18, respectively. The other ends of the resistances Rgg15 to Rgg18 are connected with the control terminals 2k to 2n, respectively.

The resistances Rgg1 to Rgg13 are resistances for supplying control signals to the transistors Qtx1 to Qtx4 and Qrx1. The electrical capacitors C1 to C6 are used as capacitors for withstanding electric power of the transistors Qtx1 to Qtx4 and Qrx1.

FIG. 3 is a circuit diagram showing the configuration of the backflow prevention circuit 28 (, 29).

The backflow prevention circuit 28 (, 29) is configured to have transistors T1, T2, and a diode (discharge block section) D. The transistor (control signal supply section) T1 includes a P channel, the transistor (discharge section) T2 includes an N channel.

One end of the transistor T1 is connected with a power source voltage VCC, and the other end of the transistor T1 is connected with an anode of the diode D. While a cathode of the diode D is connected with one end of the transistor T2 and the control terminal 2h (, 2i).

The gates of the transistors T1, T2 are connected so that the control signal C output from the controller 3 (FIG. 1) is respectively input thereto. The other end of the transistor T2 is connected with a reference potential VSS.

Next, the description will be made on the operation of the backflow prevention circuit 28 (, 29) provided in the SPDT switch 2 according to the embodiment.

For example, in the case where a transmission signal is output in the backflow prevention circuit 28 through the transistors Qtx1 and Qtx2, the control signal C for example of the Lo level equivalent to the reference potential VSS is input to the gates of the transistors T1, T2, respectively.

Thus, the transistor T1 is turned ON and the transistor T2 is turned OFF, where the power source voltage VCC is output through the transistor T1 and the diode D. The power source voltage VCC is then input to the booster circuit SC1.

The booster circuit SC1 takes a transmission signal with high power, boosts the power source voltage VCC to generate a boosted voltage, and outputs the boosted voltage to the gates of the transistors Qtx1, Qtx2, respectively. When the transmission signal has low power, the booster circuit SC1 does not operate, and the power source voltage VCC is output to the gates of the transistors Qtx1, Qtx2, respectively.

In the transmission mode, a time slot where the high power (approx. 33 dBm) passes through is followed by a time slot where the low power (approx. 5 dBm) passes through, the electric charges accumulated in the gates of the transistors Qtx1, Qtx2 will be discharged, which is, however, blocked by the diode D.

At this time, the voltages of the one ends (drains) of the respective transistors Qtx1, Qtx2 that are connected to the antenna terminal 2a, namely, the drain (antenna) voltages Vds slowly discharges through the antenna ANT.

As described above, the gate voltages Vgs of the transistors Qtx1, Qtx2 are blocked from discharging by the diode D, which makes it possible to keep the relative relation as follows: drain (antenna) voltage Vd<gate voltage Vg, as shown in FIG. 4. For this reason, it is possible to prevent the transistors Qtx1, Qtx2 from being incompletely turned ON.

In the case where the transistors Qtx1, Qtx2 are in the OFF state, in other words, when the transmission signal is not output through the transistors Qtx1 and Qtx2, the control signal C for example of the Hi level equivalent to the power source voltage VCC is respectively input thereto.

Thus, the transistor T1 is turned OFF and the transistor T2 is turned ON, where the gates of the transistors Qtx1, Qtx2 are connected to the reference potential VSS through the transistor T2. As a result, the electric charges accumulated in the gates of the transistors Qtx1, Qtx2 are discharged, and the transistors Qtx1, Qtx2 are completely turned OFF.

On the other hand, in the case where the backflow prevention circuit 28 (, 29) is not provided therein, the electric charges accumulated in the gates of the transistors Qtx1, Qtx2 are rapidly discharged through the control terminal 2h.

In addition, as the drain (antenna) voltages Vds of the transistors Qtx1, Qtx2 are slowly discharged through the antenna ANT, the potential reversion that the drain (antenna) voltage Vd is higher than the gate voltage Vg occurs as shown in FIG. 5, leading to a phenomenon that the transistors Qtx1, Qtx2 are not completely turned ON. As a result, the waveform of the transmission signal is distorted, and this causes an increase of the harmonic distortion (second harmonic distortion, third harmonic distortion).

Thus, according to the embodiment, it is possible to substantially reduce the harmonic distortion in the SPDT switch 2 by proving the backflow prevention circuits 28, 29.

Figure 6:
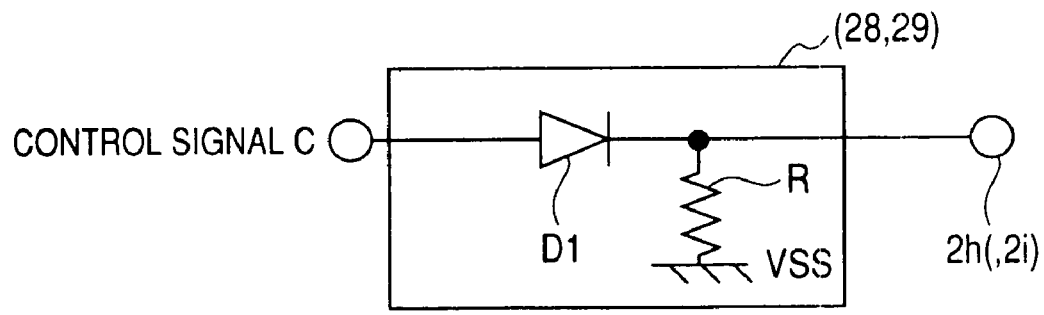
FIG. 6 is a circuit diagram showing an example of the backflow prevention circuit provided in the SPDT switch according to another embodiment of the invention.

Incidentally, in the embodiment, the backflow prevention circuit 28 (, 29) is configured using the diode and the transistors. However, for example as shown in FIG. 6, it may be configured such that the electric charges accumulated in the gates are drawn by a resistance when the transistors Qtx1, Qtx2 (or the transistors Qtx3, Qtx4) are in the OFF state.

In this case, as shown in the figure, the backflow prevention circuit 28 (, 29) is configured to have a diode (control signal supply section, discharge block section) D1 and a resistance (discharge section) R. An anode of the diode D1 is connected so that the control signal C output from the controller 3 (FIG. 1) is input thereto. While a cathode of the diode D1 is connected with the control terminal 2h(, 2i) and one end of the resistance R. Connected to the other end of the resistance R is the reference potential VSS.

For example, in the case where a transmission signal is output in the backflow prevention circuit 28 through the transistors Qtx1, Qtx2, the control signal C of a Hi signal is input to the anode of the diode D1. The Hi signal is then input to the booster circuit SC1 through the diode D1.

In the transmission mode, when a time slot where the high power (approx. 33 dBm) passes through is followed by a time slot where the low power (approx. 5 dBm) passes through, the electric charges accumulated in the gates of the transistors Qtx1, Qtx2 are blocked by the diode D1.

Further, when the transistors Qtx1, Qtx2 are in the OFF state, the gates of the transistors Qtx1, Qtx2 are connected to the reference potential VSS through the resistance R, and the electric charges accumulated in the gates of the transistors Qtx1, Qtx2 are discharged.

Because of this feature, it is also possible to prevent the potential reversion that the drain (antenna) voltage Vd increases higher than the gate voltage Vg, so that the harmonic distortion in the SPDT switch 2 can be substantially reduced.

Figure 7:
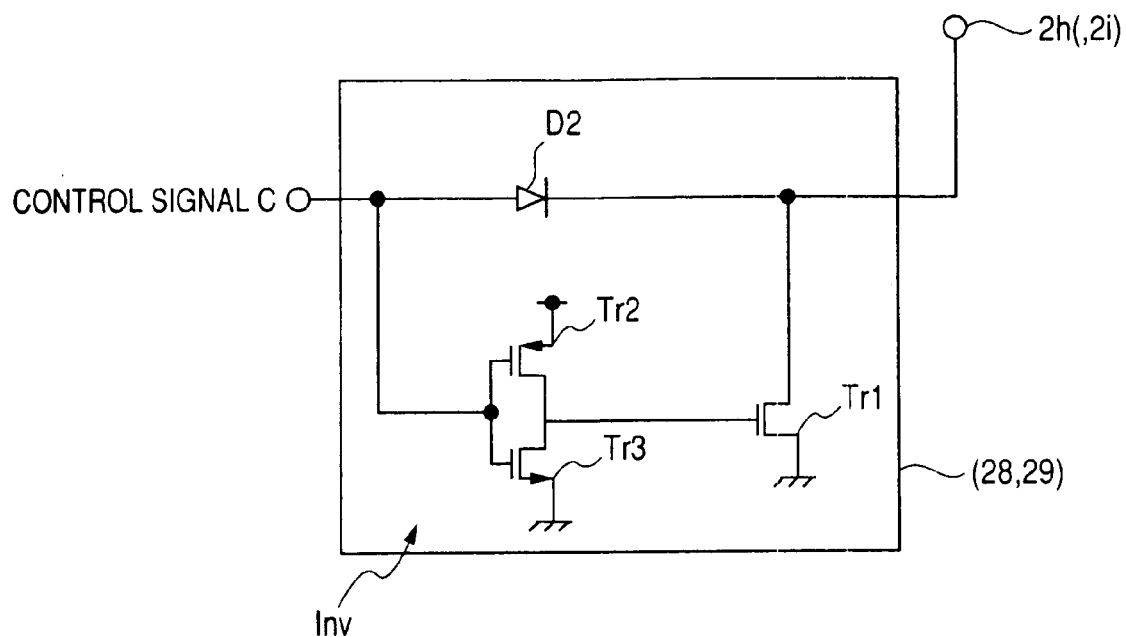
FIG. 7 is a circuit diagram showing another example of the backflow prevention circuit provided in the SPDT switch according to still another embodiment of the invention.
Figure 8:
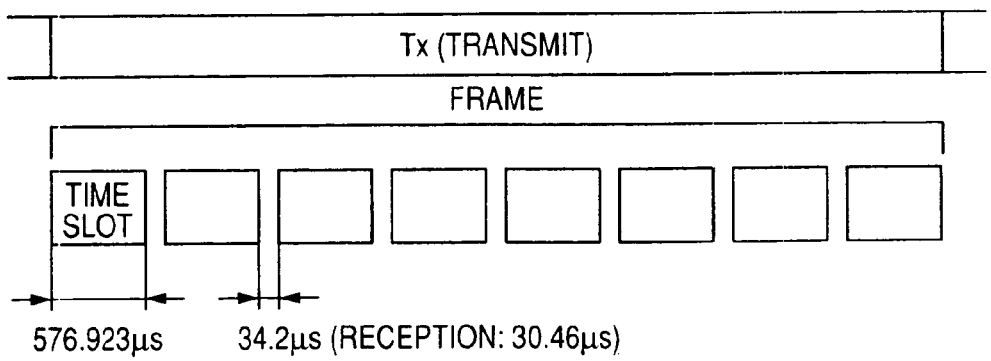
FIG. 8 is a timing chart showing a management timing example of reception data with the GSM/EDGE system.
Figure 9:
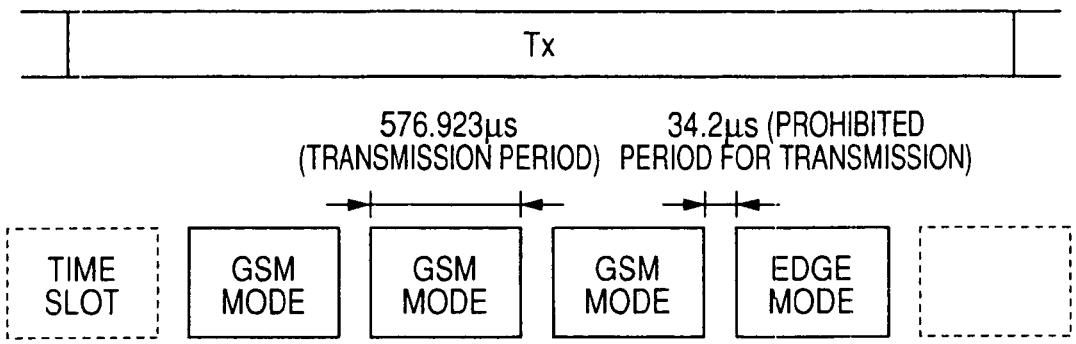
FIG. 9 is a timing chart showing a management timing example of reception data with the GSM/EDGE system using DTM.
Figure 10:
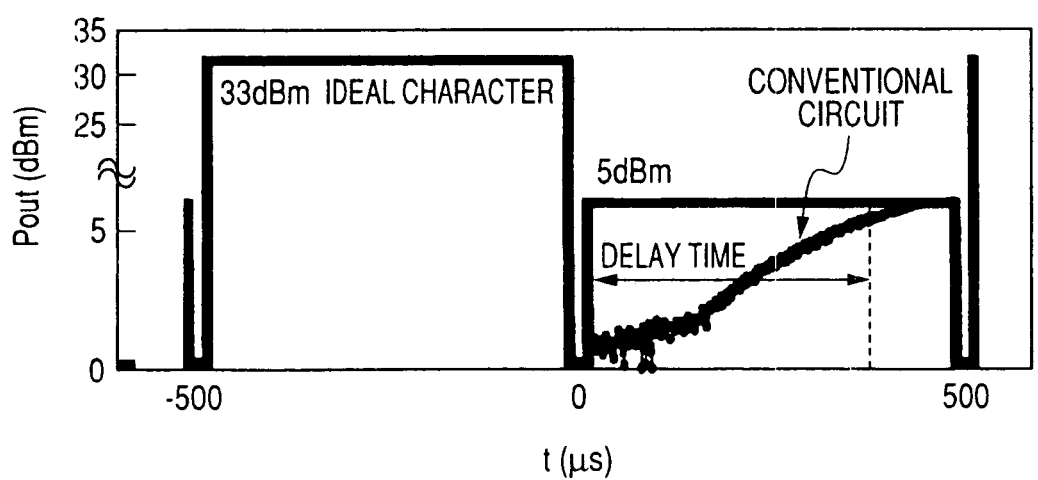
FIG. 10 is a diagram illustrating the slot timing of power at a switch output terminal that the inventor has studied.

Further, as shown in FIG. 7, the backflow prevention circuit 28 (, 29) may be configured to have an inverter Inv, a transistor Tr1, and a diode (control signal supply section, discharge block section) D2.

In this case, as shown in the figure, the backflow prevention circuit 28 (, 29) is configured such that the transistor Tr1 includes an N channel MOS and the inverter Inv includes a P-channel MOS transistor Tr2 and a N-channel MOS transistor Tr3.

The transistors Tr2, Tr3 are serially connected between the power source voltage VCC and the reference potential VSS. The gates of the transistors Tr2, Tr3 and an anode of the diode D2 are connected so that the control signal C output from the controller 3 (FIG. 1) is respectively input thereto.

The junction of the transistor Tr2 and transistor Tr3 is connected with the gate of the transistor Tr1. One end of the transistor Tr1 is connected with a cathode of the diode D2, and the other end of the transistor Tr1 is connected with the reference potential VSS. Connected to the cathode of the diode D2 is the control terminal 2h (, 2i).

In the case where a transmission signal is output through the transistors Qtx1, Qtx2 (FIG. 2) in the backflow prevention circuit 28 of FIG. 7, the control signal C of a Hi signal is input to an input part of the inverter Inv and the anode of the diode D2, respectively. The power source voltage VCC is input to the booster circuit SC1 (FIG. 2) through the diode D2.

The inverter Inv outputs a Lo signal by the control signal C of the Hi signal, and then the transistor Tr1 is turned OFF.

In the transmission mode, when a time slot where the high power (approx. 33 dBm) passes through is followed by a time slot where the low power (approx. 5 dBm) passes through, the electric charges accumulated in the gates of the transistors Qtx1, Qtx2 are blocked by the diode D2.

Further, when the transistors Qtx1, Qtx2 are in the OFF state, the control signal C of the Lo signal is input to the input part of the inverter Inv and the anode of the diode D2, respectively. Thus, the transistor Tr1 is turned ON, and the electric charges accumulated in the gates of the transistors Qtx1, Qtx2 are discharged through the transistor Tr1.

Because of this feature, it is also possible to prevent the potential reversion that the drain (antenna) voltage Vd increases higher than the gate voltage Vg, so that the harmonic distortion in the SPDT switch 2 can be substantially reduced.

The invention made by the inventor has been described specifically on the basis of the embodiments. However, it goes without saying that the present invention is not limited to the above described embodiments and may be modified in various ways without departing from the spirit and scope of the invention.

INDUSTRIAL APPLICABILITY

The invention is suitable for the technology for reducing harmonic distortion in an SPDT switch used in communication systems such as mobile phones.

What is claimed is:

1. A semiconductor integrated device used in mobile communications equipment, comprising:

a first terminal connected to an antenna;
a second terminal connected to a transmission circuit;
a third terminal connected to a reception circuit;
a switching transistor provided between said first terminal and said second terminal to switch connection between said first and second terminals;
a fourth terminal to which a control signal of said switching transistor is input;
a booster circuit for taking a transmission signal output through said switching transistor when a signal is input through said fourth terminal, generating a boosted voltage higher than the voltage level of the input signal, and applying the boosted voltage to a control terminal of said switching transistor; and
a voltage controller for performing control so that when the signal level of the transmission signal output through said switching transistor decreases, a drain voltage of said switching transistor is not higher than a gate voltage of said switching transistor.

2. The semiconductor integrated device used in mobile communications equipment according to claim 1, wherein said switching transistor is a HEMT.

3. A semiconductor integrated device used in mobile communications equipment, comprising:
a first terminal connected to an antenna;
a second terminal connected to a transmission circuit;
a third terminal connected to a reception circuit;
a switching transistor provided between said first terminal and said second terminal to switch connection between said first and second terminals;
a fourth terminal to which a control signal of said switching transistor is input;
a booster circuit for taking a transmission signal output through said switching transistor when a signal is input through said fourth terminal, generating a boosted voltage higher than the voltage level of the input signal, and applying the boosted voltage to a control terminal of said switching transistor; and
a voltage controller for performing control so that when the signal level of the transmission signal output through said switching transistor decreases, a drain voltage of said switching transistor is not higher than a gate voltage of said switching transistor, and when said switching transistor does not operate, said voltage controller discharges the electric charge accumulated in the gate of said switching transistor.

4. The semiconductor integrated device used in mobile communications equipment according to claim 3,
wherein said voltage controller comprises:
a control signal supply section for outputting a control signal to said switching transistor, based on a control signal output to said control terminal from a control circuit for controlling said switching transistor;
a discharge block section for blocking the discharge of the electric charge accumulated in the gate of said switching transistor, when the signal level of the transmission signal output through said switching transistor decreases; and
a discharge section for discharging the electric charge accumulated in the gate of said switching transistor toward the reference potential, when said switching transistor does not operate.

5. A high frequency power amplifier module, comprising:
an antenna connection switching circuit; and
a high frequency power amplifier for receiving a transmission signal from a transmission circuit and supplying an amplified transmission signal to said antenna connection switching circuit,
said antenna connection switching circuit including:
a first terminal connected to an antenna;
a second terminal connected to said high frequency power amplifier;
a third terminal connected to a reception circuit;
a switching transistor provided between said first terminal and said second terminal to switch connection between said first and second terminals;
a fourth terminal to which a control signal of said switching transistor is input;
a booster circuit for taking a transmission signal output through said switching transistor when a signal is input through said fourth terminal, generating a boosted voltage higher than the voltage level of the input signal, and applying the boosted voltage to a control terminal of said switching transistor; and
a voltage controller for performing control so that when the signal level of the transmission signal output through said switching transistor decreases, a drain voltage of said switching transistor is not higher than a gate voltage of said switching transistor.

6. The high frequency power amplifier module according to claim 5, wherein said switching transistor is a HEMT.

7. A high frequency power amplifier module, comprising:
an antenna connection switching circuit; and
a high frequency power amplifier for receiving a transmission signal from a transmission circuit and supplying an amplified transmission signal to said antenna connection switching circuit,
said antenna connection switching circuit including:
a first terminal connected to an antenna;
a second terminal connected to said high frequency power amplifier;
a third terminal connected to a reception circuit;
a switching transistor provided between said first terminal and said second terminal to switch connection between said first and second terminals;
a fourth terminal to which a control signal of said switching transistor is input;
a booster circuit for taking a transmission signal output through said switching transistor when a signal is input through said fourth terminal, generating a boosted voltage higher than the voltage level of the input signal, and applying the boosted voltage to a control terminal of said switching transistor; and
a voltage controller for performing control so that when the signal level of the transmission signal output through said switching transistor decreases, a drain voltage of said switching transistor is not higher than a gate voltage of said switching transistor, and when said switching transistor does not operate, said voltage controller discharges the electric charge accumulated in the gate of said switching transistor.

8. The high frequency power amplifier module according to claim 7,
wherein said voltage controller comprises:
a control signal supply section for outputting a control signal to said switching transistor, based on a control signal output to said control terminal from a control circuit for controlling said switching transistor;
a discharge block section for blocking the discharge of the electric charge accumulated in the gate of said switching transistor, when the signal level of the transmission signal output through said switching transistor decreases; and a discharge section for discharging the electric charge accumulated in the gate of said switching transistor toward the reference potential, when said switching transistor does not operate.

9. The high frequency power amplifier module according to claim 8, wherein said control signal supply section and said discharge section are provided in said antenna connection switching circuit, and wherein said discharge block section is externally mounted on said antenna connection switching circuit.

10. The high frequency power amplifier module according to claim 7, wherein said voltage controller is provided in said antenna connection switching circuit.

* * * * *